April 13, 1965 P. L. PORTER 3,177,980
HYDRAULIC LOCKING DEVICE WITH STROKE ADJUSTING MEANS
Original Filed March 10, 1959 2 Sheets-Sheet 1
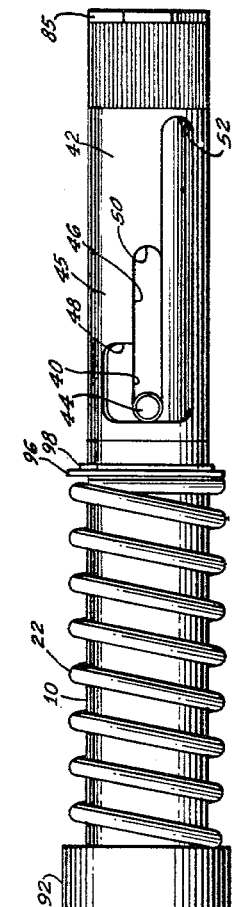
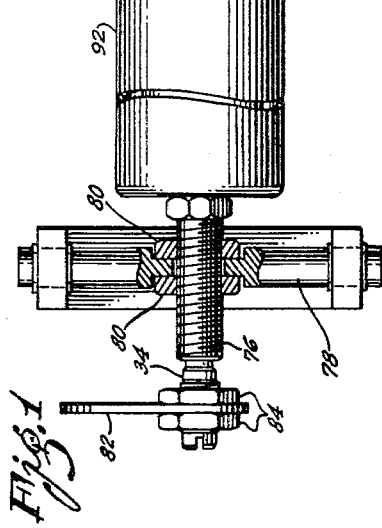
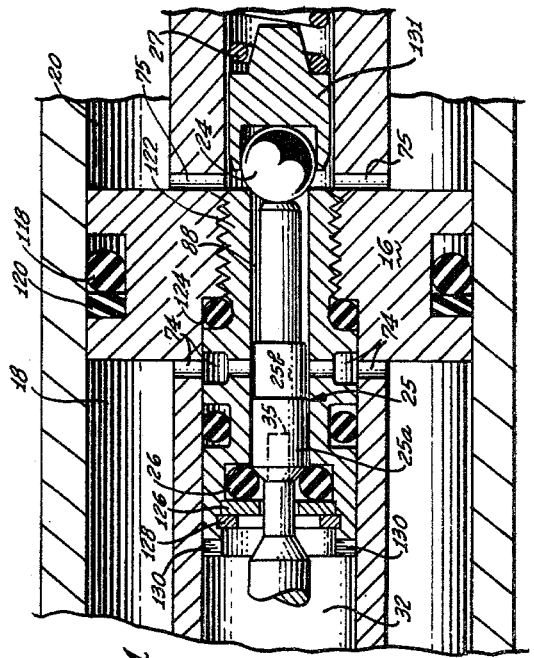
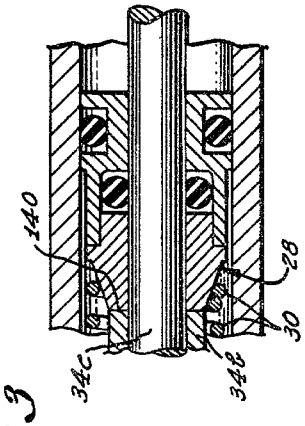
INVENTOR.
Percy L. Porter

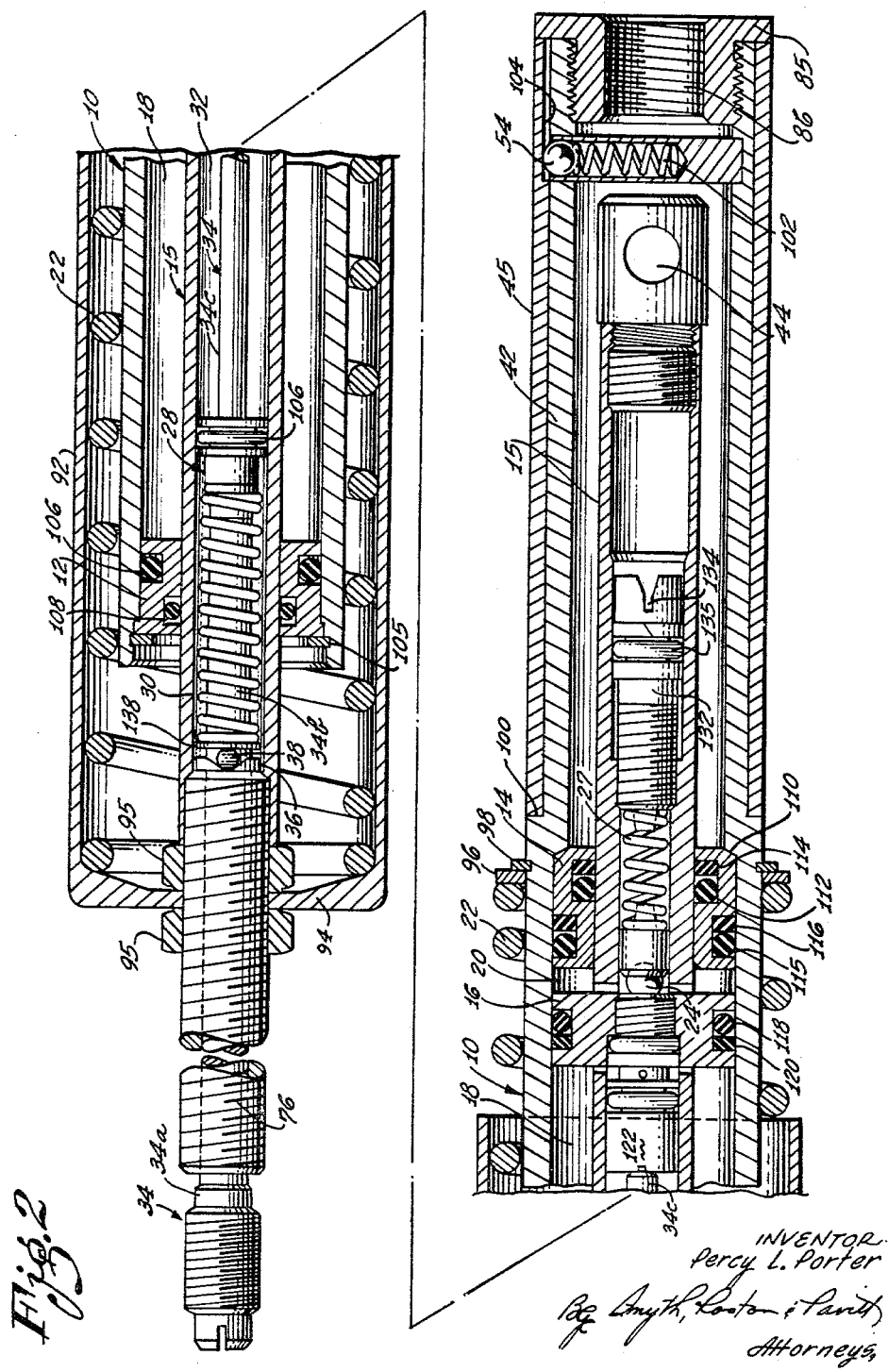

United States Patent Office 3,177,980
Patented Apr. 13, 1965

3,177,980
HYDRAULIC LOCKING DEVICE WITH
STROKE ADJUSTING MEANS
Percy L. Porter, Los Angeles, Calif., assignor to
P. L. Porter Co., Los Angeles, Calif.
Original application Mar. 10, 1959, Ser. No. 798,436, now
Patent No. 3,051,274, dated Aug. 28, 1962. Divided
and this application Jan. 11, 1962, Ser. No. 165,618
4 Claims. (Cl. 188—96)

This invention relates to a longitudinally extensible and contractible hydraulic locking device to control the spacing between two members and is a division of my copending application Serial No. 798,436 filed March 10, 1959, now issued as Patent 3,051,274. While the invention is widely applicable for its purpose, it has special utility for controlling the tiltable back rest of a reclining seat for use in aircraft and other vehicles. Such an embodiment of the invention has been selected for the present disclosure and will provide adequate guidance for those skilled in the art who may have occasion to apply the same principles to other specific purposes.

A device of this type is disclosed in the Porter et al. Patent 2,559,047 issued July 3, 1951, and the application of such a device to the control of a tiltable back rest of a reclining chair is set forth in the Armstrong Patent 2,522,246, issued September 12, 1950. These two prior disclosures are hereby incorporated in the present disclosure by reference.

A hydraulic locking device of this type comprises a cylinder confining a quantity of hydraulic fluid and a piston dividing the cylinder into two hydraulic locking chambers, the piston being unitary with a tubular piston rod which extends through both ends of the cylinder. What may be termed a locking valve controls communication between the two locking chambers and is normally closed to immobilize the piston. A heavy external coil spring functions in compression between the cylinder and the piston rod to oppose contraction of the hydraulic locking device, i.e., to oppose the backward tilt of the back rest of the seat. Thus the heavy spring serves to counterbalance and to erect the back rest.

Space inside the tubular piston rod is utilized as a reservoir in communication with one of the two hydraulic chambers to hold a reserve supply of the hydraulic fluid. This reservoir is adapted to expand and contract to accommodate thermal expansion and contraction of the structure and of the fluid in the two locking chambers.

The problem to which the present invention is directed arises from the fact that the seats in an airplane are mounted on a longitudinal track which makes it possible to remove seats and add seats at will for various types of service. For so-called "high density" seating, the seats are placed close together, for example for daytime coach service. The seats are more widely spaced for first-class daytime service to permit the back rests to be tilted backward to substantial angles. Still fewer seats at greater spacing are employed for night flying to permit the back rests to be tilted to the maximum angles. The problem is to provide seats which may be used interchangeably for these various kinds of services without the possibility of a back rest being tilted by an occupant to a greater angle than permitted by the spacing of the seats, with consequent hazard to the occupant of the next rearward seat.

The invention meets this problem by providing for adjustability of the maximum length of the stroke of the hydraulic locking device. The maximum length is selected for maximum spacing of the seats, an intermediate length is used for intermediate spacing of the seats, and a third shorter length adjustment is available for use when the seats are at minimum spacing. This feature makes the seat highly flexible in the sense that it may be readily adapted to the various kinds of service.

The features and advantages of the invention may be understood from the following detailed description taken with the accompanying drawings.

In the drawings, which are to be regarded as merely illustrative:

FIG. 1 is a side elevation of the presently preferred embodiment of the invention;

FIG. 2 is an enlarged longitudinal sectional view of the same embodiment of the invention;

FIG. 3 is an enlarged fragmentary longitudinal sectional view showing the construction of the gland of the fluid reservoir; and FIG. 4 is a similarly enlarged fragmentary longitudinal sectional view of the piston assembly including the locking valve and the check valve.

General arrangement

The principal parts of the embodiment of the invention shown in FIGS. 1 to 4 include: a cylinder 10 with two end walls 12 and 14; a tubular piston rod 15 extending through the two end walls; a piston 16 united with the piston rod and dividing the interior of the cylinder between the two end walls into two locking chambers 18 and 20; a heavy external counterbalancing coil spring 22 in compression between the cylinder and the piston rod to exert counterbalancing force; a locking valve in the form of a ball member 24 seating in the piston 16 to control fluid flow between the two locking chambers through the piston; a check valve inside the tubular piston rod in the form of a solid cylindrical valve member, generally designated 25 (FIG. 4) with a tapered shoulder for normal pressure contact with a seat in the form of an O-ring 26, this cylindrical valve body extending to the locking valve ball 24 for actuating thereof; a coil spring 27 acting under compression normally to hold both the locking valve ball member 24 and the check valve member 25 in their closed positions; a tubular gland, generally designated 28, under the pressure of a coil spring 30 to serve as one end wall of an annular fluid reservoir chamber 32, the second end wall of the chamber being provided by the check valve; an operating rod or push rod 34 extending from the exterior of the device through the gland 28 and through the O-ring 26 into a socket 35 (FIG. 4) of the check valve member 25 to shift the check valve member towards its open position and thereby unseat the locking valve ball member 24; cam means 36 cooperating with a follower in the form of a diametrical pin 38 to convert rotation of the operating rod 34 into longitudinal shift thereof to operate the two valves; means to prevent relative rotation between the cylinder 10 and the piston rod 15 comprising a pair of diametrically opposite longitudinal slots 40 (FIG. 1) in an extension 42 of the cylinder and a diametrical pin 44 that is carried by the piston rod in sliding engagement with the two slots; an adjustable stop sleeve 45 (FIG. 1) that is rotatably mounted on the cylinder extension 42 and has a pair of diametrically opposite slots 46 of stepped configuration providing corresponding pairs of stop shoulders 48, 50 and 52 to cooperate selectively with the diametrical pin 44; and detent means 54 (FIG. 2) to releasably hold the stop sleeve 45 selectively at three positions for cooperation of the stop shoulders 48, 50 and 52, respectively, with the diametrical pin 44. The detent means 54 shown in FIG. 2 is in the form of a steel ball under radial pressure by a spring 102. The inner circumference of the stop sleeve 45 has a series of three longitudinal grooves 104 for selective engagement by the detent ball, the positions of the longitudinal grooves corresponding to the effective positions of the stop shoulders 48, 50, and 52.

Operation

FIG. 1 shows how a threaded extension 76 of the tubular piston rod 15 may be secured to a fixed member 78 of the seat structure by means of a pair of cooperating nuts 80. FIG. 1 also shows how the outer end of the operating rod 34 carries an operating arm 82 that is secured thereto by a pair of cooperating nuts 84. As best shown in FIG. 2, the opposite end of the device which is the outer end of the cylinder extension 42 is provided with a bushing 85 having an internal screw thread 86 by means of which it may be operatively connected to the back rest of a seat (not shown). The connection is below the pivot axis of the back rest so that the hydraulic locking device is contracted by any backward tilt movement of the back rest, the relative position of the piston 16 being moved rightward as viewed in the drawings to contract the rightward locking chamber 20 in opposition to the resistance of the external counterbalancing spring 22.

To cause the locking valve ball 24 to be unseated for changing the adjustment of the seat back rest, the operating arm 82 of the operating rod 34 is actuated by suitable manual means which usually includes a push button (not shown) for the convenience of the occupant of the seat. The rotation of the operating rod 34 causes the follower or diametric pin 38 to climb the inclined cammed surfaces of the cam means 36 with consequent axial shift of the operating rod towards the right as viewed in the drawings. The rightward shift of the operating rod 34 correspondingly shifts the check valve member 25 to the right to unseat the locking valve ball 24 in opposition to the coil spring 27.

When the locking valve ball member 24 is unseated, fluid may pass in either direction between the locking chambers 18 and 20 through the previously mentioned radial ports 74, the annular passage 88 around the check valve member 25 and the previously mentioned radial ports 75. It is to be noted that the check valve member 25 has a longitudinally extensive enlarged portion 25a immediately adjacent the O-ring 26 and has a second enlargement 25b of slightly lesser diameter adjacent the enlargement 25a and directly opposite the radial ports 74. The first enlargement 25a fits into the surrounding structure with restricted clearance, the clearance being adequate, however, for flow between the fluid reservoir chamber 32 and the two locking chambers but sufficiently restricted to prevent any substantial transmission of dynamic pressure into the fluid reservoir 32 when the check valve is open.

The operating rod 34 is made in two longitudinal sections, one section 34a being connected to the operating arm 82 and having a tubular end portion 34b (FIG. 2) that serves as a socket for the other section 34c. The tubular end portion 34b serves as a guide for the reservoir spring 30 and its end 140 (FIG. 3) serves as a stop shoulder to limit the retraction of the gland 28 against the reservoir spring 30.

If the seat is to be used for daytime plane service, first-class, where the spacing of the seats is intermediate the restricted spacing for "coach" service and the more extensive spacing for night flying, the adjustable stop sleeve 45 is manually rotated to the position shown in FIG. 1 to place the diametrically opposite stop shoulders 50 in alignment with the guide slots 40 of the cylinder extension 42. The stop shoulders 50 limit the range of movement of the diametric pin 44 and thereby limit the extent to which the hydraulic locking device may be contracted for the backward tilt of the seat rest. As shown in FIG. 1, the locking sleeve 45 has a knurled or serrated portion 90 to facilitate this adjustment. In like manner, the stop sleeve 45 may be rotated to place the pair of diametrically opposite stop shoulders 48 in the path of the diametrical pin 44 if the seat is to be used for coach service where lesser spacing is provided between the seats; or the locking sleeve may be rotated to the opposite extreme to place the pair of diametrically opposite shoulders 52 in the path of the diametrical pin 44 when the seat is to be used for night time flight with maximum spacing between the successive seats.

My description in specific detail of the selected embodiments of the invention will suggest various changes, substitutions and other departures from my disclosure within the spirit and scope of the appended claims.

I claim:

1. In a locking device to control relative movement between two members, comprising a hydraulic cylinder connected to one of the two members, a piston rod extending through both ends of said cylinder and connected to the other of the two members, a piston united with said portion rod and dividing the interior of said cylinder into two locking chambers, and a locking valve controlling fluid flow between the two chambers to control the freedom of movement of said piston, the improvement comprising: longitudinal guide means forming a guide slot extending longitudinally beyond one end of said cylinder; cooperating means carried by the corresponding end of said piston rod in sliding engagement with said slot and guided along a straight path thereby to prevent relative rotation between the cylinder and the piston rod; and means to limit the range of movement of said piston rod, said limiting means being adjustable across the guide slot at selected points to block the path of said cooperating means thereby to limit the range of relative movement between the two members selectively.

2. In a locking device to control relative movement between two members, comprising a hydraulic cylinder connected to one of the two members, a piston rod extending through both ends of said cylinder and connected to the other of the two members, a piston united with said piston rod and dividing the interior of said cylinder into two locking chambers, and a locking valve controlling fluid flow between the two chambers to control the freedom of movement of said piston, the improvement comprising: longitudinal guide means extending longitudinally beyond one end of said cylinder; cooperating means carried by the corresponding end of said piston rod in sliding engagment with said guide means to prevent relative rotation between the cylinder and the piston rod; and a stop member mounted on said guide means and having a plurality of integral stops, said stop member being rotatable to bring said stops selectively into position to block the movement of said cooperating means at selected postions relative to said cylinder, thereby to limit the range of relative movement between said two members selectively.

3. The improvement as set forth in claim 2 which includes detent means effective between said guide means and said rotatable member to yieldingly hold said rotatable member against rotation at the selected rotary positions thereof.

4. The improvement as set forth in claim 3 in which said guide means is a cylinderical means with a longitudinal guide slot therein for sliding engagement with said cooperative means carried by the piston rod; and in which said plurality of stops comprises stop shoulders formed by a longitudinal slot in said rotatable member.

References Cited by the Examiner

UNITED STATES PATENTS

| | | | |
|---|---|---|---|
| 43,912 | 8/64 | Hittinger | 92—13 |
| 76,732 | 4/68 | Ettenger et al. | 92—13 |
| 1,149,969 | 8/15 | Tetlow | 188—96 |
| 1,903,035 | 3/33 | Ewing et al. | 188—96 |
| 2,330,518 | 9/43 | Rothery | 92—13 |
| 2,442,306 | 5/48 | McCormick | 82—13 |
| 2,507,601 | 5/50 | Kehle | 188—96 |
| 2,559,047 | 7/51 | Porter et al. | 188—96 |
| 2,581,197 | 1/52 | McFadden | 188—96 |
| 2,756,045 | 7/56 | Savory | 267—8 |
| 2,922,497 | 1/60 | Porter | 188—96 |
| 3,051,274 | 8/62 | Porter | 188—96 |

FOREIGN PATENTS 136,813 10/20 Great Britain.

ARTHUR L. LA POINT, *Primary Examiner.*

A. JOSEPH GOLDBERG, *Examiner.*